E. TRENHOLM.
Grain Drier.
No. 38,614. Patented May 19, 1863.
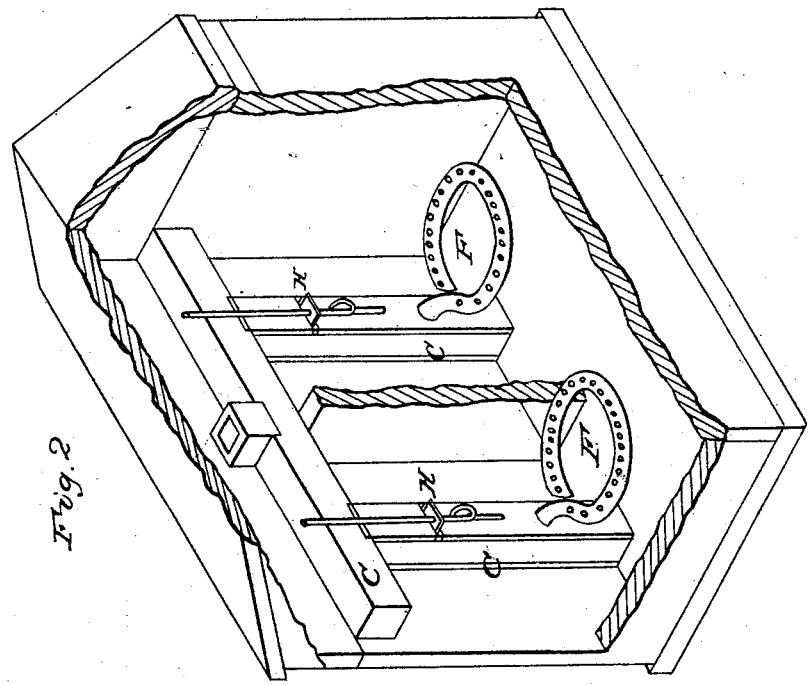
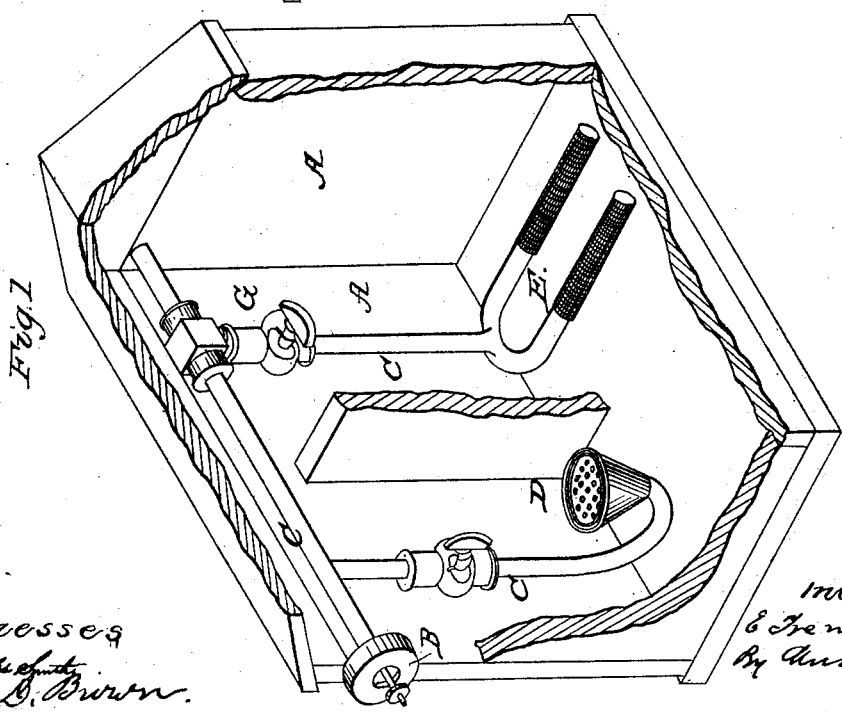

UNITED STATES PATENT OFFICE.

EDWARD TRENHOLM, OF WASHINGTON, DISTRICT OF COLUMBIA.

IMPROVEMENT IN GRAIN-DRIERS.

Specification forming part of Letters Patent No. 38,614, dated May 19, 1863.

*To all whom it may concern:*

Be it known that I, EDWARD TRENHOLM, of the city and county of Washington, in the District of Columbia, have invented a new and improved device or apparatus for ventilating and preventing the heating of grain and other substances; and I do hereby declare the following to be a full and exact description of the same, reference being had to the accompanying drawings, making part of this specification, in which various modes of applying my invention are represented in perspective views of the interior of a building.

My improved device is applicable to the ventilation of grain, coal, lumber, cotton, or any other material, either in storehouses or on shipboard, where a current of air may be needful to prevent injury from dampness, heating, or other causes. It may also be applied to the ventilation of hay and unthrashed grain in barns and like places.

The invention consists in a peculiar device for supplying forced currents of air to the interior or lower part of the substance to be ventilated, and regulating the location and volume of the said currents as may be needful.

In order that others skilled in the art to which my invention appertains may be enabled to fully understand and use the same, I will proceed to describe its construction and operation.

A A may represent the walls or sides of a building, vessel, or any structure, within which the substance may be stored or carried.

B may represent a blast-fan worked by any suitable power and means.

C C are air-tubes secured by screw-joints or other detachable connections or conductors extending from the blast-fan B into the body of grain or other substance, and delivering the current of air at the lower part. The air may pass out through a rose, as shown at D in Figure 1, through gauze, as shown at E in Fig. 1, or through perforated pipes, as shown at F in Fig. 2.

G G in Fig. 1 represent stop-cocks by which the flow of air through any of the pipes may be stopped at pleasure.

H H in Fig. 2 are sliding valves for the same purpose.

The apparatus may be arranged in any suitable way, according to the requirements of the building or vessel in which the substance is contained.

To facilitate the storage, loading, or removal of grain the pipes are attached by screw-joints or other detachable connections, and made movable so as to be taken out and put in at will.

By using a sufficient number of branches, distributed as may be needful, the entire body of grain or other substance may be effectually ventilated so as to preserve it from heating or dampness, and by the use of stop-cocks or valves, suitably constructed and applied, the flow of air to the various parts may be regulated and varied with the greatest completeness and facility.

I am aware that it is common to ventilate storehouses and vessels by means of air-pipes projecting down through or into the substance to be preserved, and by gratings permitting an ingress of air, and, also that stop-cocks have been applied to ventilating or cooling pipes. I therefore do not desire to be understood as claiming novelty in this system of ventilation; but,

Having thus described my invention, what I claim as new therein, and desire to secure by Letters Patent, is—

The combination of the fan B, or other substantially equivalent means of producing a forced current of air, the detachable branched conductors C C', the perforated mouths D, E, or F, and the stop-cocks or valves G H, when the said parts are constructed and arranged and operate as herein described, to deliver forced currents of air in any required volumes into any required parts of a body of grain or other substance, and admit of ready separation and removal to facilitate the insertion and removal of grain.

EDWD. TRENHOLM.

Witnesses:
CHARLES SMITH,
OCTAVIUS KNIGHT.